March 29, 1938.  H. C. FISHER  2,112,562
PROCESS OF DEINKING PAPER
Filed Aug. 20, 1934
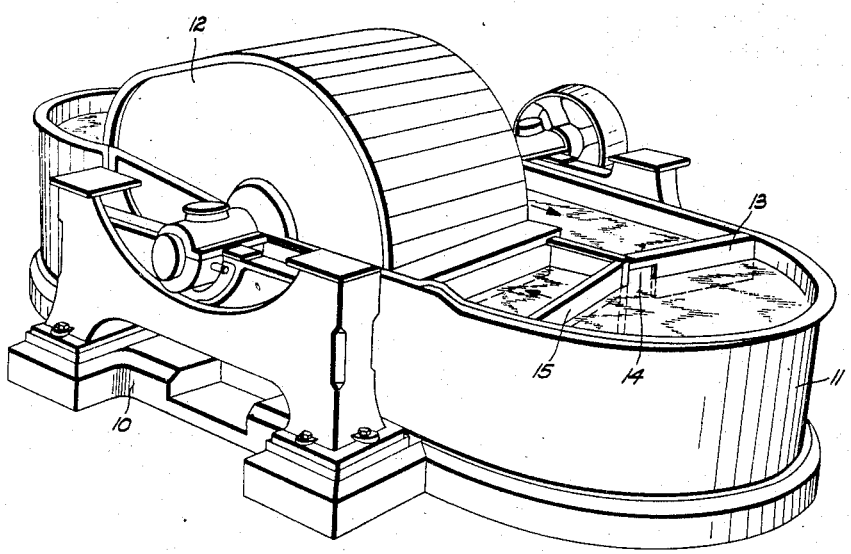
Inventor
Harry C. Fisher
Maréchal & Noe
Attorneys Patented Mar. 29, 1938

2,112,562

UNITED STATES PATENT OFFICE 2,112,562

PROCESS OF DEINKING PAPER

Harry C. Fisher, Cincinnati, Ohio, assignor to The Gardner-Richardson Company, Middletown, Ohio, a corporation of Ohio Application August 20, 1934, Serial No. 740,585

12 Claims. (Cl. 92—9)

This invention relates to the deinking of paper.

It is the principal object of the invention to provide a simple and highly effective process of treating printed paper on a commercial scale, such as newspaper, book paper, magazine stock, and the like to remove the ink therefrom and to make the paper suitable for re-use.

It is a further object to provide such a process which does not require the use of soft water, but which works entirely satisfactorily with hard water such as is customarily found in many paper making plants.

It is a further object to provide simple and effective apparatus for use in carrying out the process.

Other objects and advantages will be apparent from the description and the accompanying drawing and the appended claims.

The drawing shows in perspective an embodiment of apparatus for carrying out the invention.

In the past many methods have been proposed for the deinking of book paper, newspaper, and the like, many of these prior processes relying primarily upon a washing action to free the loosened ink from the paper. In my previous Patent No. 1,707,604, dated April 2, 1929, I have disclosed a method of deinking paper which comprises first loosening the ink and thereafter causing a flotation thereof in conjunction with a readily vaporizable oily or water immiscible material, which material with attendant ink particles, is floated upon a body of water where it is subjected to heat to cause volatilization of the oily or water immiscible material leaving the ink floating on top of the water where it can be skimmed off, the clean pulp sinking to the bottom.

I have now discovered that very desirable results may be accomplished by effecting a separation of the ink from the paper, not primarily through a washing action, but through the addition of an oily material immiscible with water and of substantially the same general nature as the vehicle originally used with the ink. The vehicles commonly used with printing ink are of two general types, the one an organic material such as linseed oil, and the other a high grade mineral oil.

According to my present invention, an oily material of predetermined and generally similar characteristics to the oily vehicle of the paper to be deinked is brought into intimate contact with this paper. The preferred additive oily material is either the product known as mineral seal oil or a pale paraffin oil, both such products being generally available on the market. However, it is possible to use other oily materials, the principal consideration being that the oil be lighter than water, as free from odor as possible, preferably colorless, or of a very light color, and having some ability to emulsify partially, but not permanently, with water. As examples of other materials which are entirely satisfactory, toluol and benzol may be mentioned although the use of these materials is not preferred on account of the tendency of such highly volatile materials to escape with consequent increase in the cost of carrying out the process. However, when such materials are used the oil with its contained ink particles may be separated from the pulp and from the remaining body of water according to the method disclosed in my above mentioned patent.

I have also determined that it is of particular importance that the oil should be brought into the most intimate contact with the ink on the paper. Water in substantial volume has been found to act as an inhibiting agent to this close contact, and accordingly, I prefer to effect the contact of the printed paper with the oil in the presence of a limited amount of water. Theoretically this contact might be obtained in the entire absence of water, but from a practical standpoint, the presence of a limited amount of water, insufficient to act as a circulating medium and leaving the paper in a non-fluent condition, is desirable in that it materially reduces the length of time required to bring about a thorough intermixture of the oil with the paper and prevents the paper itself from becoming oil soaked. As described in the specific examples hereinafter set forth, a preferred consistency range for stocks of usual characteristics is approximately 11% to 25%, within which range such paper stocks are in a non-fluent condition.

Accordingly therefore the oily material is brought into intimate contact with the paper which has been reduced to a condition of pulp of high consistency, this operation taking place if desired in the ordinary paper mill beater. The brushing action of the beater roll is not necessary however and if desired the roll may be raised from its bed or a lighter roll substituted so that the only action obtained is a circulating action. The oily material loosens the ink from the paper and tends to form a suspension of the ink particles, separating the ink from the paper.

The presence of a considerable volume of water is of great importance however in effecting the separation of the oil and suspended ink particles after the intimate contact and separation of the ink from the paper has been effected. Accordingly the pulp of high consistency with the added oily material is circulated for a suitable period of time in the beater until the desired intimate contact has been obtained. Thereupon the consistency of the pulp is reduced to assist in the final separation of the ink from the paper. Generally there should be sufficient water present at this state to act as a circulating medium.

I have also discovered that the separation is enhanced and collection of the ink particles is also facilitated if the surface flow of stock in the beater or other mixing means is interrupted in a suitable manner. In the simplest form this apparatus may comprise a baffle plate extending slightly below the top surface of the pulp and completely blocking the movement of the surface thereof. This baffle plate apparently acts to slow up the travel of the pulp with emulsified ink particles therein, allowing the individual particles to meet and agglomerate, whereupon they rise to the surface and are collected in front of the baffle in the form of a scum which can be removed in any suitable manner. A series of these baffles, one after another and extending down into the pulp various distances, assists the flotation of the oily ink. For example, one or more baffles extending an appreciable distance below the surface and having a cut-away portion over a part of their extent may be provided, followed at a suitable distance by one or more baffles extending a lesser distance into the liquid but extending completely across the surface thereof. Better results are secured by having the baffles relatively spaced from the beater roll or other mixing device.

As above mentioned, the separation of the ink from the pulp is facilitated by decreasing the consistency of the pulp, so as to allow freer upward motion of the emulsified oily ink particles, and it has been found that this separation is further facilitated by raising the temperature of the pulp or by producing an agitation thereof. The latter steps may be conveniently combined if desired by introducing steam jets into the pulp, thereby heating the pulp and also causing a bubbling or agitating thereof which, as mentioned, aids in the agglomerating action. In some cases sufficient steam for this purpose may be available quite inexpensively as a waste product, but in other cases where this is not true, air may be bubbled up through the pulp to effect agitation thereof. Any suitable means for agitating the body of pulp may be employed.

In place of using the ordinary paper mill beater, a wide variety of different mixing devices may be used, such for example as mixers of the type of Werner-Pfleiderer, Banbury, Watson, extrusion, pan, etc. Also, super-added substances can be added to the paper pulp or half stock as it passes through the Jordan machine, hydrator, pulper, or any such type of fiber preparing device. In general any type of mixing device may be used which will permit of bringing the super-added substances into intimate contact with the paper in the presence of a minimum amount of water, generally less than that amount required to act as a circulating medium. The use of mechanical equipment to permit the beater to operate at higher consistencies is of advantage.

The drawing shows an embodiment of an apparatus for carrying out the invention. A conventional beater 10 is shown comprising a beater roll rotatably mounted in the circulating tank 11, cover 12 being positioned over the beater roll. When the usual beater is used, it is desirable to raise the roll to provide increased clearance, a beating action as such not being required. The pulp suspension is introduced into the tank and is circulated therein by the rotating beater roll. Suitably spaced from the beater roll is the deep baffle 13, extending down into the pulp stream an appreciable distance; this baffle is formed with a cut-away portion 14, which permits passage of the pulp therethrough. The action of the plate however is to facilitate the subsequent collection of the ink particle, one or more baffles of this character being used as desired to obtain the most efficient action. Following the deep baffle or baffles, one or more surface baffles 15 are provided which dip only a small distance below the surface, and extend entirely across the stream of pulp. These baffles provide for the collection of the ink particles as a scum appearing in front of the baffles. The scum can be removed by any convenient means.

In place of using the above type of mixing devices, a mixer may be used which will permit of subjecting the stock to pressure while the additive materials are being mixed. For this purpose the usual rotary digester, common to the paper industry, will serve very satisfactorily since it provides for a continued agitation and stirring of the contents which may be subjected throughout to steam pressure. The usual steam pressures will range from one to twenty pounds gauge but with papers containing ground wood, it is preferable to keep the pressure in the neighborhood of one to five pounds gauge so as to prevent any discoloration of the paper stock. In using an apparatus of this character, much higher pulp consistencies may be used than with a beater type mixing apparatus. If the oily material is added to the rotary digester, there is no necessity for adding additional oil, but the contents of the cooker may be discharged into a beater where separation as described above will take place.

It may also be of advantage in certain cases to effect a preliminary treatment of the pulp to cause a loosening of the ink from the paper, which may be then followed by bringing the oily material of the proper character into contact with the loosened ink. Several parts of sulfonic acid material, such as the Twitchell reagent types of organic soluble sulfonates, may be added to assist in the loosening of the oxidized oily vehicle of the ink. Also alkaline material such as soda ash or sodium silicate may be used for the same purpose. It may also be advantageous in certain instances to add a material soluble in both oil and water thereby acting as a species of "bridge" so that it will come into contact with the ink and transfer it to the floating oil layer. Such a substance is acetone, and incorporation of a small amount thereof into the contents of the beater is of advantage.

The following are specific examples of ways in which the process may be carried out on a practical commercial basis. Where the use of cold water followed by a heating process is given, it is to be understood that warm water can be used if desired.

Example No. 1

1500 parts by weight of waste newspapers were beaten out in ordinary well water at room temperature with the addition of 284 parts by weight of sodium silicate of 43° Bé., 60% solids, and a silica to sodium oxide ratio of 3.25 to 1. Within a few minutes after the addition of the silicate, 84.6 parts by weight of mineral seal oil as produced by the Standard Oil Company of Indiana were added to the pulp before the beater roll and thus intermixed with the pulp. About three minutes later the baffles were placed in position and two minutes thereafter the air jet was started for agitation. The insertion of the baffles started the collection of oily ink films at once and this was greatly assisted by the air agitation. These operations were carried out with the pulp at a temperature of 68° F.

Twenty minutes after the addition of sodium silicate more water was added to the pulp whereupon a more rapid rise of ink into the collected films occurred. As time passed, the occasional addition of a few drops of mineral seal oil further assisted the separation of ink. Finally, the pulp was washed with fresh water to remove the last traces of ink and oil.

Example No. 2

1000 parts by weight of waste newspapers, 43.75 parts by weight of pale paraffin oil, and 8000 parts by weight of well water were placed in a rotary digester and a steam pressure of 15 pounds gauge was held for two hours. The entire warm contents of the digester were then placed in a conventional beater, using cold well water. After ten minutes the pulp was diluted to a consistency of 1.7% and the baffle and air jet placed in operation. A very heavy flotation of black ink occurred at once. After twenty minutes' more beating, the pulp was further diluted to a consistency of 1.4%, which again assisted the separation of ink. After proper flotation of the ink, the pulp was washed with clean water and the fibers made ready for use.

Very satisfactory results are also obtained by subjecting the paper to steam pressure in a rotary digester in the presence of an alkaline material, followed by the subsequent addition of an oily material. The following is an example of the process as carried out in this manner.

Example No. 3

The rotary digester was supplied with 2000 parts by weight of waste newspapers, 100 parts by weight of soda ash, and 16,000 parts by weight of well water. Steam pressure of five pounds gauge was supplied to the digester for two hours. After discharge, the reddish-brown liquor formed in the pulp was drained off.

The hot pulp was then charged into the beater, using cold well water, and it was brushed out for about 15 minutes, the temperature of the pulp at this time being about 70° F. Thereupon 85 parts by weight of mineral seal oil was poured into the pulp before the beater roll and intermixed for twenty minutes, at which time the baffle was placed in position. During the next ten minutes the pulp was diluted to 1.6% consistency and agitation with the air jet commenced. Thereupon, and during the next 45 minutes, a very effective separation of black oily ink films occurred continuously, the films being removed by scraping.

As above mentioned, it has been found that the addition of soap or sulfonic acid material is effective to assist in the loosening of the inky material. An example of such a process follows.

Example No. 4

1500 parts by weight of printed newspapers, black color, were beaten out in hard well water at a temperature of 65° F. To this was added as a paste in hot water, 100 parts by weight of amber soap flakes. The consistency of the pulp was 2.8%. After intermixing the soap solution 15 minutes it was seen that a grayish colored curdy scum, due to the hard water, had formed and also that the water had a soapy appearance. The insertion of a baffle at this stage of the process caused the accumulation of a grayish scum which, however, did not contain a material quantity of black ink particles. After thoroughly intermixing the soap solution, 110 parts by weight of sulfonic acid was added and intermixed by thorough beating. The sulfonic acid was a dark molasses-like reddish-brown viscous liquid, smelling of sulfur dioxide. After thorough mixing of the sulfonic acid, the grayish scum increased but still did not show any signs of containing black ink particles. Seven minutes thereafter, 129 parts by weight of commercial toluol was poured in slowly before the beater roll and worked into the roll the temperature remaining at 65° F.

After ten minutes intermixing of the toluol, the baffles were placed in position and immediately a collection of grayish black scum occurred. The pulp was further diluted to a consistency of 2%, and the air jet was started to assist in bringing the ink particles to the surface. As the collection of the scum continued the pulp fell to the bottom of the beater substantially freed of ink and the ink was continually scraped off the top together with the volatile toluol.

Following the freeing of the paper from the ink particles, it is also necessary to separate the oily material from the pulp and, particularly in the case of the more expensive materials, it is also important that it be separated from the ink and reused. Where a highly volatile material such as toluol is used, separation and recovery thereof is easily accomplished by the process of my above mentioned patent; briefly, this is accomplished through the addition of heat which drives off the volatile material, leaving the remaining material free and clear of this material.

Where, however, non-volatile oils are used such as mineral seal or paraffin oil, it is desired to add a material capable of breaking down the emulsion of this material in water. The ability of the various sulfonic acid compounds or of their alkaline salts for this purpose is utilized. When employing such a sulfonate material merely for the purpose of removing residual oil, it can be added to the oil containing pulp in a beater or other circulating device after the largest practical amount of ink has been floated off. The remaining oily material in the pulp exists more or less as an unstable emulsion which the sulfonated material tends to break up whereupon a further flotation of oil and ink occurs.

Not only does the present process not require soft water for its successful operation, but the use of hard water is actually of advantage in that with the addition of these sulfonated materials, a reaction occurs with certain constituents of the hard water with the resulting formation of insoluble sulfonates, such as calcium sulfonate, which are thrown out in the form of grayish slimy scum which further acts to assist in the flotation of ink and oil. Any remaining amounts of the sulfonic materials may be quite readily removed through the addition of a salt such as calcium chloride which reacts to produce the insoluble calcium sulfonate resulting in the separation thereof. Thus, by the proper use of the sulfonated substances and materials reactive with it, the pulp can be freed from oil, ink and sulfonated material.

The following is an example of the use of such sulfonated material.

Example No. 5

1000 parts by weight of waste newspapers, 22 parts by weight of mineral seal or paraffin oil, and 3000 parts by weight of water were charged into a rotary digester to which steam pressure of 5 pounds gauge was supplied for two hours.

The hot contents of the digester were furnished into a beater using cold well water which became heated to 74° F. After 30 minutes' beating the baffle was placed in operation and a flotation of black oily ink occurred.

Sixty-five minutes later live steam and compressed air were blown into the pulp to heat and agitate it, thereby raising its temperature to 122° F. During the next ten minutes a further addition of 3.5 parts by weight of paraffin oil was made and finally 55 parts by weight of sulfonic acid was slowly added before the beater roll and intermixed.

Due to the blowing in of live steam, the pulp was heated and diluted and started to foam. The addition of sulfonic acid was made with the pulp at a temperature of 112° F. and the immediate formation of a grayish black oil scum was removed with the foam. After the further removal of ink the fibers were washed and used.

The sulfonic acid was here used to assist the removal of excess oil.

The following is an example of the use of sulfonic acid to assist in the loosening of the ink particles with the addition of a precipitating chemical for the sulfonic acid to cause it to separate from the pulp.

Example No. 6

1000 parts by weight of waste newspapers, 50 parts by weight of sulfonic acid and 5000 parts by weight of water were charged into a rotary digester and 5 pounds gauge steam pressure maintained for two hours. This material was then discharged into a beater, the pulp temperature being 72° F. After some minutes of beating, the baffle was inserted and a heavy film of black ink started to collect behind the baffle plate. A few minutes later 23 parts of pale paraffin oil was incorporated into the pulp by adding it in front of the beater roll, the baffle being removed for 5 minutes while the oil was incorporated. Immediately upon the replacement of the baffle a heavy oil separation occured. Fifteen minutes later the pulp was diluted to a consistency of 1.4% whereupon a still heavier flotation of ink occurred.

Subsequent to this, after the removal of the bulk of the ink, a solution of calcium chloride was added to react with the remaining sulfonic acid to produce an insoluble calcium sulfonate material which was floated off.

A material having properties which tend to agglomerate the ink particles and facilitate their separation may also be used. Such a substance is the colloidal clay known as bentonite which may be added to the contents of the beater or during the flotation of the ink where it will produce beneficial results. An example of the use of such materials follows.

Example No. 7

The rotary digester was charged with 1000 parts by weight of waste newspapers, 22 parts by weight of pale paraffin oil, 25 parts by weight of amber soap flakes and 5000 parts by weight of water, steam pressure of 5 pounds gauge being maintained for two hours.

The digester contents were supplied to a beater using cold well water and live steam was immediately added, resulting in the heating of the beater contents to 130° F. After beating, from time to time sulfonic acid was added until a total quantity of 68 parts by weight was incorporated, this operation requiring 17 minutes. About one hour later 60 parts of bentonite clay were intermixed with the pulp by throwing it in front of the beater roll.

During the time of incorporation of the sulfonic acid and thereafter, the baffle was in position and there was a collection of black ink scum on the surface as well as a separation of scum in the bottom of the beater. The addition of the bentonite clay assisted in the final washing of the pulp to prepare the fibers for use.

Where predetermined controlled quantities of oily material and other additive materials are used, the pulp will be in proper condition for use without additional cleaning or washing treatment. However, such washing is usually necessary and may be effected in any customary manner, as by simple washing in clean water. This washing operation has for its object primarily removing traces of the additive substances rather than removal of the loosened ink. Such washing operation will free the pulp of any dissolved coloring matter that may be present in the water of the pulp, and in many instances is a necessary step for that reason. To assist in the removal of additive substances and, if desired, to help loosen the ink from the fibers before the flotation stage, use can be made of those detergent materials that are unaffected by hard water that go under the trade name of "Gardinol" and "Igepon". These, in powder or granular form, can be added to the paper pulp as and where proven most advantageous.

Should it be desired to bleach the recovered fibers, this operation may be carried out in any of the well-known manners at a convenient stage of the flotation process, but it may be most conveniently done after the removal of at least the bulk of the printing ink. The addition of dyes to tint the bleached or unbleached pulp to the desired shade of color can be done in the well-known manner.

While the forms of process herein described constitute preferred embodiments of the invention, it is to be understood that the invention is not limited to these precise processes, and that changes may be made therein without departing from the scope of the invention which is defined in the appended claims.

What is claimed is:

1. The process of deinking paper which comprises bringing a material of a character generally similar to the oily vehicle of the original printing ink into intimate contact with the ink on the paper in the presence of a small amount of water, the quantity of water being such that the paper remains in a non-fluent condition with the water acting to reduce the time required for thorough intermixture with the ink vehicle and avoiding oil-soaking of the paper, agitating the paper in the presence of said material and added quantities of water to cause a separation of the ink from the paper, and collecting particles of said material together with the ink on top of a body of water.

2. The process of deinking paper which comprises loosening the ink from the paper by bringing a small quantity of a solvent material of a character generally similar to the ink vehicle and immiscible with water into intimate contact with the paper to be deinked in the presence of a limited quantity of water to give a consistency of approximately 11% to 25%, said solvent material effecting separation of the ink from the paper, and thereafter adding additional water to produce a consistency of the order of 1.4% or more to facilitate separation of said deinked paper from said solvent material containing the ink particles.

3. The process of deinking paper which comprises adding water to the paper in such amount as to give a consistency of approximately 11% or more, adding a sulfonate material and a small quantity of an oil capable of softening the oily vehicle of the ink, mixing the paper in the presence of said sulfonate material, said oil and water to cause an intimate mixture of the oil with the ink and a resultant separation of the ink from the paper and emulsification thereof, collecting the oil with the removed ink as a layer on top of a body of water, and adding a material to cause the breaking of the oil water emulsion to provide for the recovery of said oil.

4. The process of deinking paper which comprises mixing a mass of paper with water to provide a high consistency non-fluent stock, the quantity of water being insufficient to act as a circulating medium, adding a quantity of oil to the stock in said high consistency condition, said oil being of such character that it is adapted to soften the oily vehicle of the ink to effect a separation of the ink from the paper, adding water to cause dilution of the stock, to a condition where it is free flowing agitating the stock in the beater, and adding a finely divided mineral material to the stock to cause a rapid agglomeration of the individual separated oil particles to produce particles of larger size with a resultant collection of the removed ink and said mineral material on top of a body of water as a layer of scum.

5. The process of deinking paper which comprises mixing a mass of paper and with a predetermined limited amount of water sufficient to give a relatively high consistency non-fluent stock, adding an oily material in small amounts to the stock while maintaining a steam pressure of approximately up to 20 pounds gauge to effect loosening of the ink particles, thereafter mixing the stock with a larger quantity of water, and effecting an agglomeration of the oily particles containing separated ink to cause the ink particles to collect on the surface of the stock as a scum.

6. The process of deinking paper which comprises subjecting the paper in the presence of a relatively small amount of water such that the paper is in a non-fluent condition to an agitating action, maintaining a steam pressure of approximately up to 20 pounds gauge on said stock during said agitating step, thereafter adding additional quantities of water to the stock while subjecting it to further agitating treatment, adding a quantity of an oily material for dissolving the oily vehicle of the ink, the agitation of the stock in the presence of the water and said oily material serving to effect a breaking up of the oily material into fine particles to which ink particles adhere, and effecting an agglomeration of said fine particles of oily material with the attendant ink particles to cause a collection of the ink on the surface of the stock.

7. The process of deinking paper in a paper beater which comprises supplying the paper to the beater in the presence of a limited quantity of water such that the paper is in a non-fluent condition, adding a soap material and sulfonic acid, continuing the agitation of the material in the beater and subsequently adding a volatile organic solvent capable of effecting a dissolving action upon the vehicle of the ink and bringing it into intimate contact with the vehicle of the ink to effect loosening thereof, continuing the beating to effect separation of the oil and ink particles from the paper, and finally interrupting free flow of the stock in the beater adjacent the surface thereof to cause an agglomeration of the separated oily particles with the attendant ink particles, said material collecting as a scum on the surface of the stock.

8. The process of deinking paper which comprises effecting a preliminary treatment of the paper in the presence of an alkaline material to cause a softening of the ink, thereafter bringing an oily material into intimate contact with the ink on the paper in the presence of only a limited quantity of water such that the paper is in a non-fluent condition, whereby the oily vehicle of the ink is softened and the ink particles become attached to the individual particles of oily material, circulating the stock with said dispersed oily material therein, and effecting an interruption of the circulation to cause a collection and agglomeration of said oily particles with the resultant collection of the ink on the surface of the stock.

9. The process of deinking paper which comprises converting the paper to pulp in the presence of only sufficient water to give a consistency of approximately 11% or more, bringing an oily material into intimate contact with the paper and with the ink thereon, producing an agitation of the stock in the presence of said oily material to break up the oily material into fine particles to further bring it into the desired intimate contact with the ink, whereby the oily material acts as a solvent for the oily vehicle of the ink and an emulsion of the oily materials carrying the ink particles is formed in the stock, thereafter reducing the consistency of the stock, and causing an agglomeration of the oily particles with a resultant collection and separation of the ink.

10. The process of deinking paper which comprises wetting the paper with water in an amount insufficient to act as a circulating medium leaving the paper in a non-fluent condition, adding an oily material capable of softening the oily vehicle of the ink, mixing the paper in the presence of said material and water to cause a separation of the ink from the paper, adding additional water sufficient to act as a circulating medium for the paper and placing the paper in fluent condition, and to facilitate the collection of the separated ink particles and the oily material on the surface of the liquid.

11. The process of deinking paper which comprises effecting a preliminary treatment of the paper in the presence of an alkaline material to cause a preliminary softening of the ink, thereafter bringing an oily material of a character generally similar to the oily vehicle of the ink and having a solvent action thereon into intimate contact with the paper in the presence of insufficient water to act as a circulating medium, the wet paper being in a non-fluent condition, adding additional water sufficient to act as a circulating medium, and effecting an agglomeration and collection of the separated ink particles on the surface of the stock.

12. The process of deinking paper which comprises treating the paper with an alkaline material to effect a preliminary softening action on the ink, agitating the paper in the presence of a limited amount of water such that the paper is in a non-fluent condition and under steam pressure of approximately up to 20 pounds gage, adding an oily material having a solvent action on the oily vehicle of the ink, thereafter reducing the stock consistency and effecting an agglomeration of the oily particles containing separated ink to cause the ink particles to collect on the surface of the stock as a scum.

HARRY C. FISHER.